(No Model.)
J. BERKEY.
CASTER.
No. 318,533. Patented May 26, 1885.
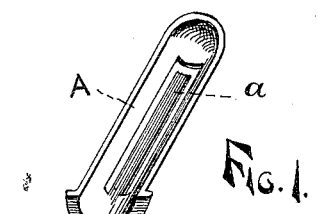
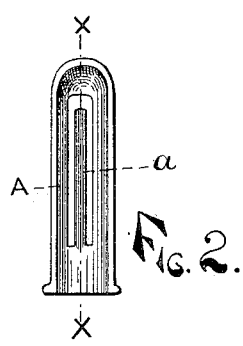
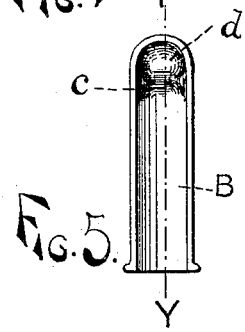
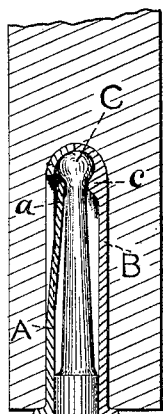
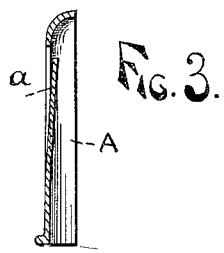
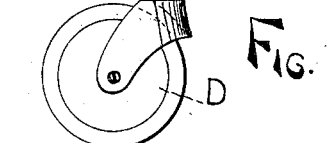
WITNESSES:
Arthur C. Denison
Fred W. Stevens
INVENTOR
Julius Berkey
BY Edward Taggart
His ATTORNEY
N. PETERS, Photo-Lithographer, Washington, D. C.

UNITED STATES PATENT OFFICE.

JULIUS BERKEY, OF GRAND RAPIDS, MICHIGAN.

CASTER.

SPECIFICATION forming part of Letters Patent No. 318,533, dated May 26, 1885.

Application filed February 10, 1885. (No model.)

*To all whom it may concern:*

Be it known that I, JULIUS BERKEY, a citizen of the United States, residing at the city of Grand Rapids, in the county of Kent and State of Michigan, have invented certain new and useful Improvements in Casters for Furniture, of which the following is a specification.

My invention relates to a socket for receiving the shank of the caster, said socket being provided with a spring made from the same material and formed out of the same piece as one side of the socket; and the object of my invention is to have the spring in the socket hold the caster in place and keep it from dropping out when the article of furniture to which it is applied is lifted from the floor, and at the same time not to hold the caster so firmly but that it may readily be removed and inserted. This object I accomplish by means of the mechanism illustrated in the accompanying drawings. The socket is made in two parts, and when in use the two parts are put together so as to form the socket, and are driven into the opening in the furniture provided to receive the same.

Figure 1 is a perspective view of one-half of the socket, showing the tongue which acts as the spring. Fig. 2 is a plan view of the same part. Fig. 3 is a sectional view of the same on line $x$ $x$ of Fig. 2. Fig. 4 is a perspective view of one-half of a socket without the spring-tongue, but provided with a ridge or elevation for holding the ball of the caster-shank. Fig. 5 is a plan view of the part shown by Fig. 4. Fig. 6 is a sectional view of the same half-socket on line $y$ $y$ of Fig. 5, and Fig. 7 is a sectional view of the entire socket in position in the furniture with caster in place.

Similar letters refer to similar parts throughout the several views.

A represents a half-socket of iron or other metal, having the tongue $a$, formed by casting the half-socket and tongue in one piece, the tongue projecting or inclining inwardly, as shown in Fig. 3.

B is a half-socket without the tongue $a$, but having a ridge, $c$, and a depression, $d$, for holding the ball C of the caster-shank. The form of the ridge $c$ and depression $d$ is shown in Figs. 6 and 7.

D is the caster-wheel.

The shank is in the ordinary form, except it is provided with the ball or enlarged portion C, so as to be held in place by the springs or spring and ridge $c$.

Two of the half-sockets A when put together form a complete socket, or the half-socket A and half-socket B are put together to form a complete socket. Whichever way the socket is formed, the ball C has a complete socket in which it turns readily with but little friction, and the caster will be held in place by the tongue so that it will not drop out, yet can be readily removed and replaced.

I have found by experiment that in a socket, A, cast from common gray iron the tongue $a$ will have sufficient elasticity to form a good and efficient spring, whether the socket be made of two half-sockets, like A, or of two half-sockets, one like A and one like B, and I consider a half-socket cast with the opening to form the tongue, as shown in Figs. 1, 2, and 3, the cheapest and most desirable form of making the spring-tongue; but instead of casting the half-socket as above described, the half-socket A, with tongue $a$, may be formed out of wrought metal in a die.

I am aware that a spring is not broadly new for holding a pintle in place.

Having thus described my invention, what I claim to have invented, and desire to secure by Letters Patent, is—

In a caster-socket, the half-socket A, provided with a tongue, $a$, integral with and formed of a part of the half-socket A, substantially as and for the purpose described.

JULIUS BERKEY.

Witnesses:
ARTHUR S. DENISON,
FRED W. STEVENS.